March 19, 1963 H. N. ROCKS ETAL 3,081,582
CONTROL WHEEL MOTOR INTERLOCK WITH LOADING
AND EJECTING MECHANISM
Filed May 3, 1962 2 Sheets-Sheet 1
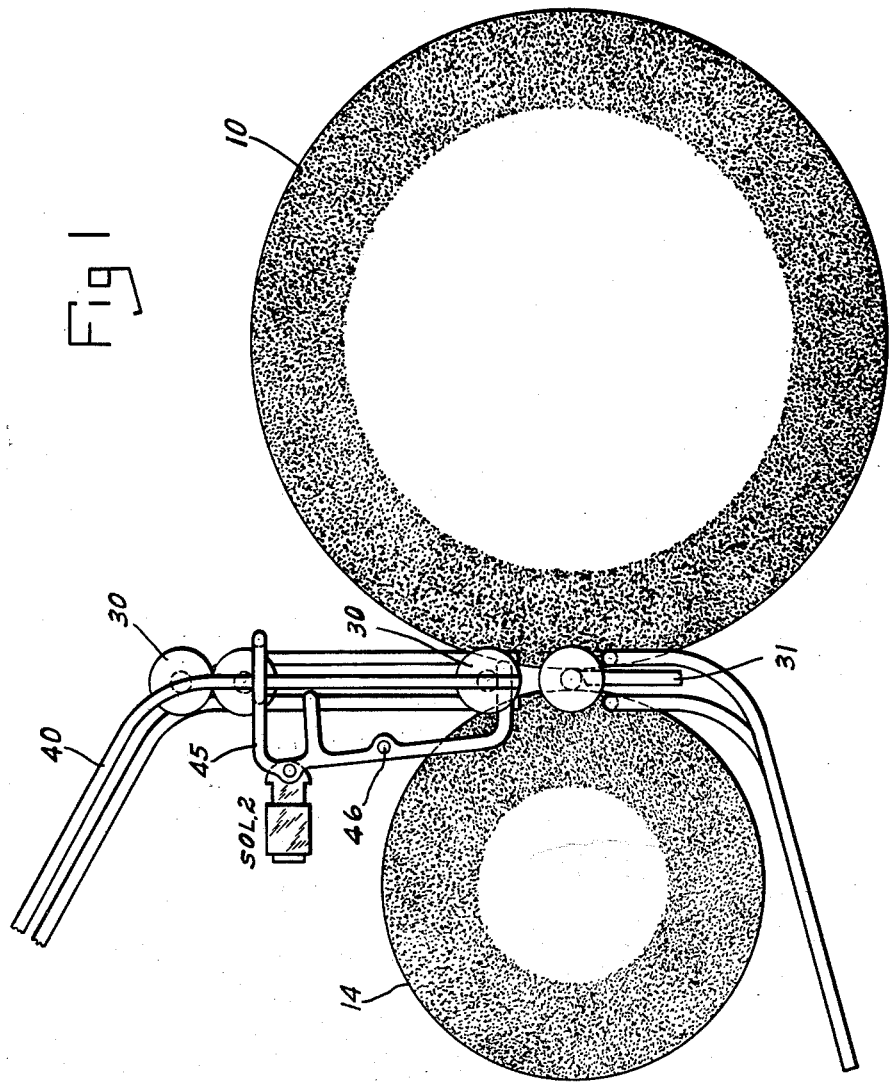
INVENTORS
HUGH N. ROCKS
BY GLENN M. SNYDER
ATTORNEY

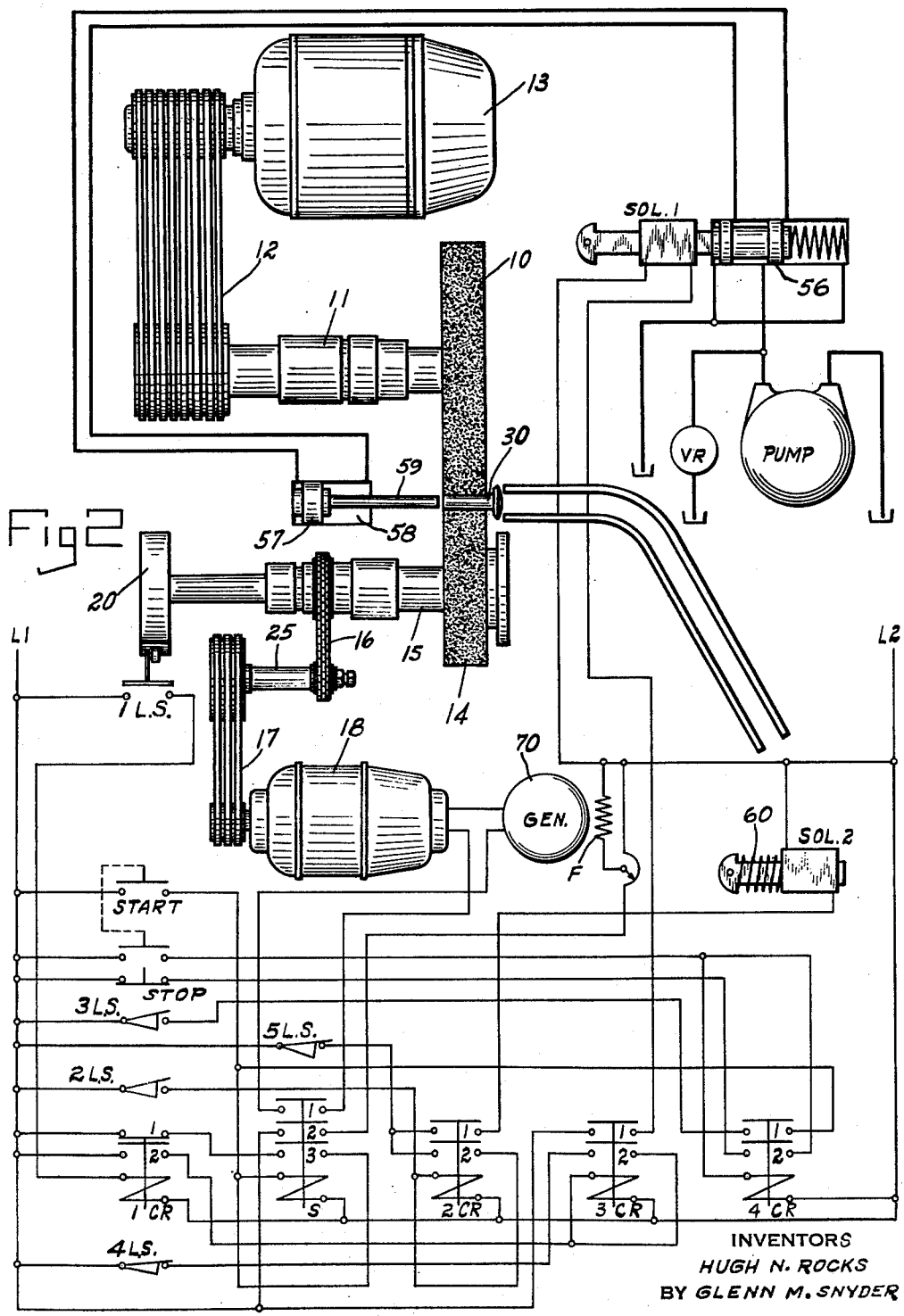

United States Patent Office 3,081,582
Patented Mar. 19, 1963

3,081,582
CONTROL WHEEL MOTOR INTERLOCK WITH
LOADING AND EJECTING MECHANISM
Hugh N. Rocks and Glenn M. Snyder, Waynesboro, Pa.,
assignors to Landis Tool Company, Waynesboro, Pa.
Filed May 3, 1962, Ser. No. 192,206
3 Claims. (Cl. 51—103)

This invention relates to a centerless grinding machine, particularly those having a non-cylindrical control wheel for feeding a workpiece against the grinding wheel as well as rotating the workpiece.

In this type of centerless grinder, a workpiece is ground for one rotation of the control wheel. Such machines often include means for ejecting a finished workpiece and inserting an unfinished workpiece. During this loading and ejecting period, the control wheel rotates at its normal rate so that a substantial portion of its peripheral surface passes through the point of operation without being a part of the grinding operation. In order to use a greater portion of the peripheral surface of the control wheel during the grinding of a workpiece, the rate of rotation of the control wheel was reduced during the loading and ejecting interval.

It was later provided for stopping the rotation of the control wheel during the loading and ejecting period so that practically the entire peripheral surface could be used for rotating a workpiece during grinding. With this device, the period during which the control wheel stops, is controlled by a timing device.

It is, therefore, an object of the present invention to provide means for stopping a control wheel at the end of one revolution and starting it again as soon as the loading and ejecting operation is completed.

Another object is to provide means operable by the loading mechanism for starting the rotation of the control wheel at the end of the loading operation.

FIG. 1 is a diagrammatic end elevation showing the relative position of the grinding wheel and control wheel shaft.

FIG. 2 is a hydraulic and electric circuit for controlling the loading and ejecting of a workpiece and the rotation of the control wheel.

Grinding wheel 10 is rotatably mounted on spindle 11 driven through belts 12 by motor 13. Control wheel 14 is mounted in peripherally opposed relation to grinding wheel 10 on spindle 15 driven by chain drive 16 from jack shaft 25. Jack shaft 25 is driven through belts 17 by motor 18. Cam 20 on the end of spindle 15 serves to operate limit switch 1LS which initiates the loading and ejecting cycle including stopping and starting control wheel 14.

The work loading device 45 consists of a set of conventional tracks 40 for guiding workpieces 30 into grinding position which is determined by grinding wheel 10 and control wheel 14 and work rest 31. Work loader 45 pivotally mounted at 46 and actuated by solenoid 2, controls the feeding of workpieces 30 into the grinding throat.

Operation

With a workpiece 30 in the machine, the operation is started by closing the circuit to relay S by means of a cycle start switch. Relay S is held energized by holding relay contact $S_3$ in the circuit through normally closed relay contact 1CR1. The cycle start switch also closes a circuit to energize relay 4CR.

Relay contact 4CR2 closes in the circuit which includes the cycle stop switch to maintain control relay 4CR energized. Relay contact 4CR1 in the circuit to relay S which includes limit switch 3LS, serves as a means to stop the automatic cycle by opening the circuit between loader reset limit switch 3LS and motor relay S.

Relay contacts $S_1$ and $S_2$ close in the control wheel motor circuit to start rotation of control wheel 14. At a predetermined point in the rotation of control wheel 14, limit switch 1LS is closed momentarily by cam 20 on spindle 15 to energize relay 1CR. Normally closed relay contact 1CR1 opens to deenergize relay S and open the contacts $S_1$ and $S_2$ to stop motor 18. Relay contact 1CR2 closes to energize relay 3CR.

Relay contact 3CR2 closes in a circuit which includes normally closed ejector reverse limit switch 4LS to hold relay 3CR. Relay contact 3CR1 operates ejector solenoid 1 to actuate ejector valve 56 which directs fluid to the head end of cylinder 58 to shift ejector piston 57 and plunger 59 to eject workpiece 30. The ejector operates limit switch 4LS to open the circuit to relay 3CR to deenergize ejector solenoid 1 and cause said ejector to return to starting position.

Upon return movement of the ejector, limit switch 2LS is closed momentarily in the circuit to loader relay 2CR. Relay contact 2CR2 closes in the circuit with normally closed loader reversing limit switch 5LS to hold loader relay 2CR. Relay contact 2CR closes to energize loader solenoid 2. Solenoid 2 actuates loader 45 in a clockwise direction to drop workpiece 30 into the machine. This movement of loader 45 opens limit switch 5LS and deenergizes relay 2CR and loader solenoid 2.

Reset spring 60 returns loader 45 in a counter-clockwise direction to close loader limit switch 3LS momentarily. Limit switch 3LS energizes relay S. Relay contact $S_3$ is a holding circuit. Relay $S_2$ completes a circuit to energize field F of generator 70. Relay contact $S_1$ connects generator 70 to motor 18 to resume rotation of control wheel 14.

We claim:

1. In a centerless grinder having a grinding wheel, a cam-shaped control wheel for rotating and feeding a workpiece toward said grinding wheel for each revolution of said control wheel, a motor for driving said control wheel, an electric circuit for said motor, a switch and means rotatable with said control wheel for actuating said switch to stop said motor, means for loading and ejecting workpieces, control means operable by said switch to actuate said loading means, and means actuated by said loading means to resume rotation of said control wheel after a workpiece has been placed in the machine.

2. In a centerless grinder having a grinding wheel, a cam-shaped control wheel for rotating and feeding a workpiece toward said grinding wheel for each revolution of said control wheel, a motor for driving said control wheel, an electric circuit for said motor, a switch and means rotatable with said control wheel for actuating said switch to stop said motor, a workpiece ejector, means actuated by said switch to actuate said ejector to eject a workpiece, means for loading workpieces into the machine, means responsive to the operation of said ejector to actuate said loader, and means actuated by said loader to resume rotation of said motor and said control wheel.

3. In a centerless grinder having a grinding wheel, a cam-shaped control wheel for rotating and feeding a workpiece toward said grinding wheel for each revolution of said control wheel, a motor for driving said control wheel, an electric circuit for said motor, a switch and means rotatable with said control wheel for actuating said switch to stop said motor, means for loading workpieces in said machine, and means actuated by said loading means to resume rotation of said motor and said control wheel after it has placed a workpiece in the machine.

References Cited in the file of this patent
UNITED STATES PATENTS

| | | |
|---|---|---|
| 2,624,985 | Happel | Jan. 13, 1953 |
| 2,735,237 | Balsiger | Feb. 21, 1956 |
| 2,801,499 | Jones | Aug. 6, 1957 |
| 2,814,919 | Jones et al. | Dec. 3, 1957 |
| 2,911,763 | Todd et al. | Nov. 10, 1959 |
| 2,963,832 | Ohringer | Dec. 13, 1960 |